(12) United States Patent
Pugh et al.

(10) Patent No.: US 10,690,940 B2
(45) Date of Patent: Jun. 23, 2020

(54) METHODS AND APPARATUS FOR ELECTROACTIVE VARIABLE APERTURE LENSES

(71) Applicant: Johnson & Johnson Vision Care, Inc., Jacksonville, FL (US)

(72) Inventors: Randall B. Pugh, Jacksonville, FL (US); Frederick A. Flitsch, New Windsor, NY (US); Praveen Pandojirao, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 15/876,337

(22) Filed: Jan. 22, 2018

(65) Prior Publication Data

US 2018/0252944 A1    Sep. 6, 2018

Related U.S. Application Data

(60) Provisional application No. 62/466,464, filed on Mar. 3, 2017.

(51) Int. Cl.
| | |
|---|---|
| *G02F 1/137* | (2006.01) |
| *G02C 7/08* | (2006.01) |
| *G02C 7/04* | (2006.01) |
| *G02C 7/10* | (2006.01) |
| *G02C 11/00* | (2006.01) |
| *G02F 1/1343* | (2006.01) |

(52) U.S. Cl.
CPC .............. *G02C 7/083* (2013.01); *G02C 7/04* (2013.01); *G02C 7/101* (2013.01); *G02C 11/10* (2013.01); *G02F 1/137* (2013.01); *G02F 1/134309* (2013.01)

(58) Field of Classification Search
None
See application file for complete search history.

(56) References Cited

U.S. PATENT DOCUMENTS

| | | | |
|---|---|---|---|
| 2006/0095128 A1 | 5/2006 | Blum et al. | |
| 2007/0139792 A1 | 6/2007 | Sayag | |
| 2009/0033863 A1* | 2/2009 | Blum ....................... | A61F 2/14 |
| | | | 351/159.34 |
| 2009/0204207 A1 | 8/2009 | Blum et al. | |
| 2010/0234942 A1 | 9/2010 | Peyman | |

(Continued)

FOREIGN PATENT DOCUMENTS

| | | |
|---|---|---|
| EP | 2848985 A2 | 3/2015 |
| WO | WO2014/064259 A1 | 5/2014 |
| WO | WO2014/054946 A1 | 4/2015 |

OTHER PUBLICATIONS

SG Search Report for 10201801494R dated May 23, 2018.

(Continued)

*Primary Examiner* — James A Dudek

(57) ABSTRACT

This invention discloses methods and apparatus for providing a variable aperture insert into a lens. A liquid crystal layer may be used to provide a variable aperture function and in some examples. In other examples, electrochromic, photochromic, liquid meniscus or electroactive elastomeric devices may form a light blocking element of a variable aperture insert. In some examples, an ophthalmic lens is cast-molded from a silicone hydrogel including a variable aperture insert.

8 Claims, 11 Drawing Sheets

(56) References Cited

U.S. PATENT DOCUMENTS

2013/0166025 A1 6/2013 Pugh et al.
2013/0245754 A1 9/2013 Mazzocchi et al.
2013/0261744 A1 10/2013 Gupta et al.
2013/0265507 A1* 10/2013 Ford .................. G02C 7/04
 349/13

OTHER PUBLICATIONS

EP Search Report for 18 15 9657 Date of Completion Jul. 25, 2018.
RU Search Report for 2018107560 Date of Completion Dec. 6, 2018.

* cited by examiner

658

659'

METHODS AND APPARATUS FOR ELECTROACTIVE VARIABLE APERTURE LENSES

This patent application claims the benefit of U.S. Provisional Patent Application No. 62/466,464 filed on Mar. 3, 2017.

BACKGROUND OF THE INVENTION

1. Field of the Invention

This invention describes a lens device with a variable aperture capability and, more specifically, in some examples, the fabrication of an ophthalmic lens with a variable aperture insert.

2. Discussion of the Related Art

Traditionally lenses of various kinds including an ophthalmic lens, such as a contact lens or an intraocular lens provided a predetermined optical quality. A contact lens, for example, may provide one or more of the following: vision correcting functionality; cosmetic enhancement; and therapeutic effects, but only a set of vision correction functions. Each function is provided by a physical characteristic of the lens. Basically, a design incorporating a refractive quality into a lens provides vision corrective functionality. A pigment incorporated into the lens may provide a cosmetic enhancement. An active agent incorporated into a lens may provide a diagnostic and/or therapeutic functionality.

There are examples of ophthalmic lenses incorporating a masking layer that creates a small "pinhole" aperture. The static masking layer creates an ophthalmic lens that improves the clarity of the image that a user observes. However, for normal uses when the user does not have to focus on detail, the experience can be unfulfilling with the perception of tunnel vision and missed peripheral content. Nevertheless, the improvement aspect of an aperture creates the possibility of novel lens devices which operate with electroactive control over a variable aperture and afford a user the ability to gain clarity under detailed use.

SUMMARY OF THE INVENTION

Accordingly, the present invention includes innovations relating to a variable apearature insert that may be energized and incorporated into a lens. In some examples, the lens may be an ophthalmic lens which is capable of changing the clarity of a detailed image and upon a directed switching of state reestablishing a normal static lens performance. Examples of such ophthalmic devices may include a contact lens or an intraocular lens. In addition, methods and apparatus for forming a variable aperture ophthalmic lens with a variable aperture insert with elements that are switch between opaque and clear status are presented. Some examples may also include a cast-molded silicone hydrogel contact lens with a rigid or formable energized insert, which may additionally include a variable aperture portion, wherein the insert is included within the ophthalmic lens in a biocompatible fashion. The formable energized insert may also be encapsulated in standard contact lens material such as hydrogel.

BRIEF DESCRIPTION OF THE DRAWINGS

The foregoing and other features and advantages of the invention will be apparent from the following, more particular description of preferred examples of the invention, as illustrated in the accompanying drawings.

DETAILED DESCRIPTION OF THE INVENTION

Figure 1:
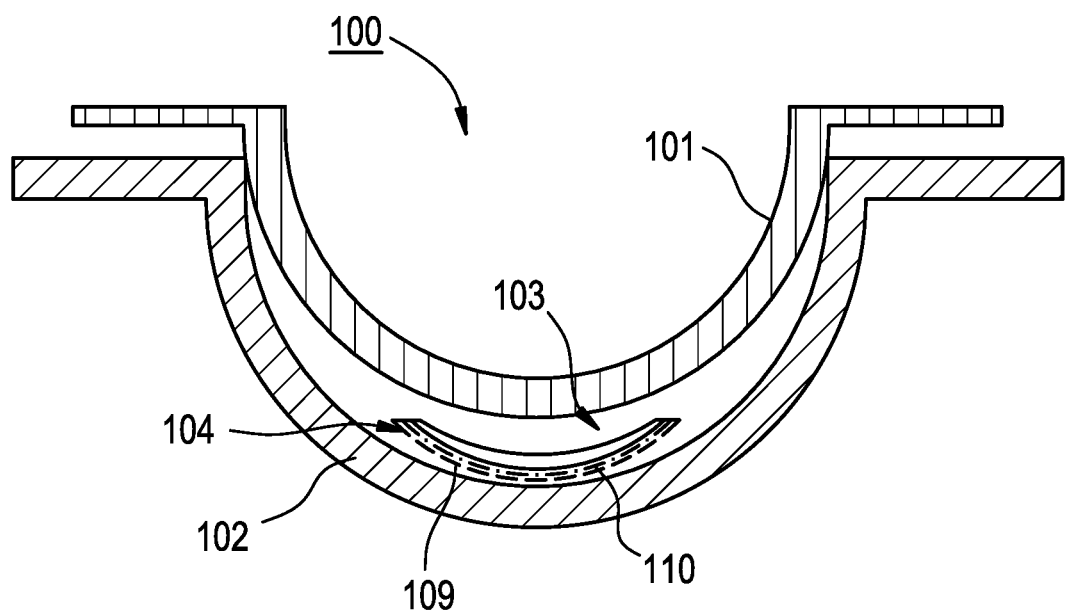
FIG. 1 illustrates exemplary mold assembly apparatus components that may be useful in implementing some examples of the present invention.

The present invention includes methods and apparatus for manufacturing an ophthalmic lens with a variable aperture insert wherein the variable aperture portion is comprised of a liquid crystal or a composite material which itself includes liquid crystal constituents. In addition, the present invention includes an ophthalmic lens with a variable aperture insert comprised of liquid crystal incorporated into the ophthalmic lens.

According to the present invention, an ophthalmic lens is formed with an embedded insert and an energy source, such as an electrochemical cell or battery as the storage means for the Energy. In some examples, the materials comprising the energy source may be encapsulated and isolated from an environment into which an ophthalmic lens is placed. In some examples the energy source may include an electrochemical cell chemistry which may be used in a primary or rechargeable configuration.

A wearer-controlled adjustment device may be used to vary the optic portion. The adjustment device may include, for example, an electronic device or passive device for increasing or decreasing a voltage output or engaging and disengaging the energy source. Some examples may also include an automated adjustment device to change the variable aperture portion via an automated apparatus according to a measured parameter or a wearer input. Wearer input may include, for example, a switch controlled by wireless apparatus. Wireless may include, for example, radio frequency control, magnetic switching, patterned emanations of light, and inductance switching. In other examples activation may occur in response to a biological function or in response to a measurement of a sensing element within the ophthalmic lens. Other examples may result from the activation being triggered by a change in ambient lighting conditions as a non-limiting example.

Variation in optic power may occur when electric fields, created by the energization of electrodes, causes realignment within the liquid crystal layer thereby shifting the molecules from the resting orientation to an energized orientation. In other alternative examples, different effects caused by the alteration of liquid crystal layers by energization of electrodes may be exploited such as, for example, changing of the light polarization state, particularly, polarization rotation.

In some examples with liquid crystal layers, there may be elements in the non-optical zone portion of the ophthalmic lens that may be energized, whereas other examples may not require energization. In the examples without energization, the liquid crystal may be passively variable based on some exterior factor, for example, ambient temperature, or ambient light.

An alternative example may derive when the physical lens elements that contain the liquid crystal layers are shaped themselves to have different focal characteristics. The electrically variable index of refraction of a liquid crystal layer may then be used to introduce changes in the focal characteristics of the lens based on the application of an electric field across the liquid crystal layer through the use of electrodes. The index of refraction of a liquid crystal layer may be referred to as an effective index of refraction, and it may be possible to consider each treatment relating to an index of refraction as equivalently referring to an effective index of refraction. The effective index of refraction may come, for example, from the superposition of multiple regions with different indices of refraction. In some examples, the effective aspect may be an average of the various regional contributions, while in other examples the effective aspect may be a superposition of the regional or molecular effects upon incident light. The shape that the front containment surface makes with the liquid crystal layer and the shape that the back containment surface makes with the liquid crystal layer may determine, to first order, the focal characteristics of the system. While referring to refractive characteristics of the liquid crystal layer, the patterning of these refractive characteristics may impart to the lens diffractive characteristics that are used to effectively alter focal characteristics of the lens.

In the following sections detailed descriptions of examples of the invention will be given. The description of both preferred and alternative examples are examples only, and it is understood that to those skilled in the art that variations, modifications and alterations may be apparent. It is therefore to be understood that said examples do not limit the scope of the underlying invention.

Glossary

In this description and claims directed to the presented invention, various terms may be used for which the following definitions will apply:

Alignment layer: as used herein refers to a layer adjacent to a liquid crystal layer that influences and aligns the orientation of molecules within the liquid crystal layer. The resulting alignment and orientation of the molecules may affect light that passes through the liquid crystal layer. For example, the alignment and orientation may act with refractive characteristics upon the incident light. Additionally, the effect may include alteration of the polarization of the light.

Aperture: as used herein refers to a portion of a lens system which allows light to pass through to an image plane, wherein the region surrounding the aperture is masked to block light that could otherwise proceed through to the image plane.

Electrical Communication: as used herein refers to being influenced by an electrical field. In the case of conductive materials, the influence may result from or in the flow of electrical current. In other materials, it may be an electrical potential field that causes an influence, such as the tendency to orient permanent and induced molecular dipoles along field lines as an example.

Energized: as used herein refers to the state of being able to supply electrical current to or to have electrical energy stored within.

Energized orientation: as used herein refers to the orientation of the molecules of a liquid crystal when influenced by an effect of a potential field powered by an energy source. For example, a device containing liquid crystals may have one energized orientation if the energy source operates as either on or off. In other examples, the energized orientation may change along a scale affected by the amount of energy applied.

Energy: as used herein refers to the capacity of a physical system to do work. Many uses within this invention may relate to the said capacity being able to perform electrical actions in doing work.

Energy source: as used herein refers to device capable of supplying energy or placing a biomedical device in an energized state.

Energy Harvesters: as used herein refers to device capable of extracting energy from the environment and convert it to electrical energy.

Interstices and Interstitial as used herein refer to regions within the boundaries of a polymer networked layer that are unoccupied by portions of the polymer and may be locations for other atoms or molecules to reside. Typically, herein, a liquid crystal molecule itself may co-reside in a region within the polymer network and the space that said liquid crystal therefore occupies may be classified as an interstice.

Intraocular lens: as used herein refers to an ophthalmic lens that is embedded within the eye.

Lens-Forming Mixture or Reactive Mixture or reactive monomer mixture (RMM): as used herein refers to a monomer or prepolymer material that may be cured and crosslinked or crosslinked to form an ophthalmic lens. Various examples may include lens-forming mixtures with one or more additives such as: UV blockers, tints, photoinitiators or catalysts, and other additives one might desire in an ophthalmic lens such as, for example, contact or intraocular lenses.

Lens-Forming Surface: as used herein refers to a surface that is used to mold a lens. In some examples, any such surface may have an optical quality surface finish, which indicates that it is sufficiently smooth and formed so that a lens surface fashioned by the polymerization of a lens-forming mixture in contact with the molding surface is optically acceptable. Further, in some examples, the lens-forming surface may have a geometry that is necessary to impart to the lens surface the desired optical characteristics, including, for example, spherical, aspherical and cylinder power, wave front aberration correction, and corneal topography correction.

Liquid Crystal: as used herein refers to a state of matter having properties between a conventional liquid and a solid crystal. A liquid crystal may not be characterized as a solid, but its molecules exhibit some degree of alignment. As used herein, a liquid crystal is not limited to a particular phase or structure, but a liquid crystal may have a specific resting orientation. The orientation and phases of a liquid crystal may be manipulated by external forces, for example, temperature, magnetism, or electricity, depending on the class of liquid crystal.

Lithium Ion Cell: as used herein refers to an electrochemical cell where Lithium ions move through the cell to generate electrical energy. This electrochemical cell, typically called a battery, may be reenergized or recharged in its typical forms.

Media insert or insert: as used herein refers to a formable or rigid substrate capable of supporting an energy source within an ophthalmic lens. In some examples, the media insert also includes one or more variable aperture portions.

Mold: as used herein refers to a rigid or semi-rigid object that may be used to form lenses from uncured formulations. Some preferred molds include two mold parts forming a front curve mold part and a back curve mold part.

Ophthalmic Lens or Lens: as used herein refers to any ophthalmic device that resides in or on the eye. These devices may provide optical correction or modification, or may be cosmetic. For example, the term "lens" may refer to a contact lens, intraocular lens, overlay lens, ocular insert, optical insert, or other similar device through which vision is corrected or modified, or through which eye physiology is cosmetically enhanced (e.g. iris color) without impeding vision. In some examples, the preferred lenses of the invention are soft contact lenses which are made from silicone elastomers or hydrogels, which include, for example, silicone hydrogels and fluorohydrogels.

Optical or optic zone: as used herein refers to an area of an ophthalmic lens through which a wearer of the ophthalmic lens sees.

Power: as used herein refers to work done or energy transferred per unit of time.

Rechargeable or Reenergizable: as used herein refers to a capability of being restored to a state with higher capacity to do work. Many uses within the present invention may relate to the capability of being restored with the ability to flow electrical current at a certain rate for certain, reestablished time period.

Reenergize or Recharge: as used herein refers to the restoration of an energy source to a state with higher capacity to do work. Many uses within the present invention may relate to restoring a device to the capability to flow electrical current at a certain rate for a certain, reestablished time period.

Released from a mold: as used herein refers to a lens is either completely separated from the mold, or is only loosely attached so that it may be removed with mild agitation or pushed off with a swab.

Resting orientation: as used herein refers to the orientation of the molecules of a liquid crystal device in its resting, non-energized state.

Variable aperture: as used herein refers to the capacity to change an optical quality, for example, the size of a transparent region of the lens which alters the depth of field of the lens system.

Ophthalmic Lenses

Referring to FIG. 1, an apparatus 100 to form ophthalmic devices comprising sealed and encapsulated inserts is depicted. The apparatus includes an exemplary front curve mold 102 and a matching back curve mold 101. A variable aperture insert 104 and a body 103 of the ophthalmic device may be located inside the front curve mold 102 and the back curve mold 101. In some examples, the material of the body 103 may be a hydrogel material, and the variable aperture insert 104 may be surrounded on all surfaces by this material.

The variable aperture insert 104 may comprise multiple liquid crystal layers (also called layers containing liquid crystal.) Other examples may include a single liquid crystal layer, some of which are discussed in later sections. The use of the apparatus 100 may create a novel ophthalmic device comprised of a combination of components with numerous sealed regions.

In some examples, a lens with a variable aperture insert 104 may include a rigid center soft skirt design wherein a central rigid optical element including the layer containing liquid crystal 109 and the layer containing liquid crystal 110 is in direct contact with the atmosphere and the corneal surface on respective anterior and posterior surfaces. The soft skirt of lens material (typically a hydrogel material) is attached to a periphery of the rigid optical element, and the rigid optical element may also add energy and functionality to the resulting ophthalmic lens.

Figure 2A:
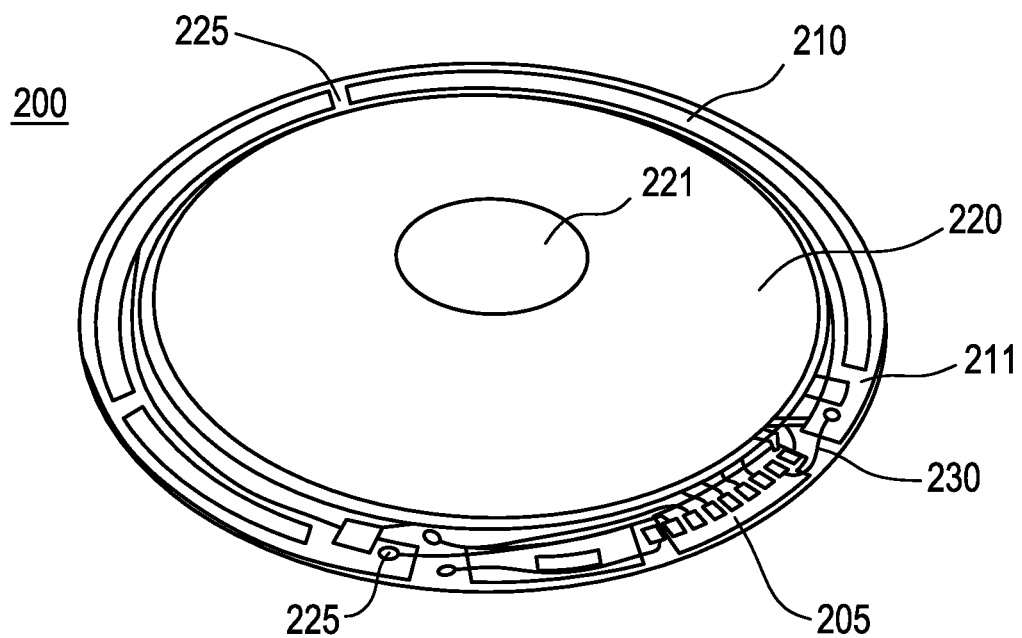
FIGS. 2A and 2B illustrate an exemplary energized ophthalmic lens with a variable aperture insert embodiment.
Figure 2B:
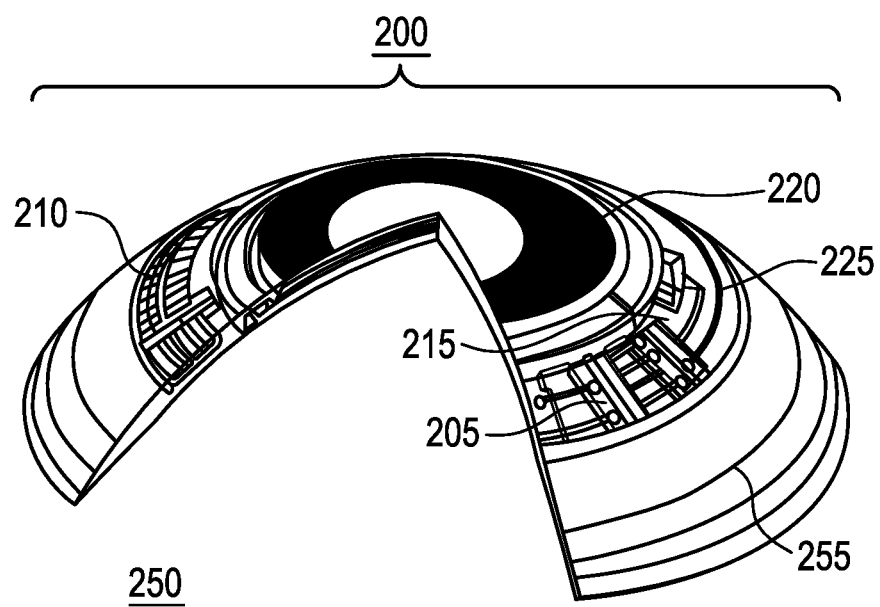

Referring to FIG. 2A, at 200 a top down and FIG. 2B at 250 a cross sectional depiction of an example of a variable aperture insert is shown. In this depiction, an energy source 210 is shown in a periphery portion 211 of the variable aperture insert 200. The energy source 210 may include, for example, a thin film, rechargeable lithium ion battery or an alkaline cell based battery. The energy source 210 may be connected to interconnect features 214 to allow for interconnection. Additional interconnects at 255 and 230 for example may connect the energy source 210 to a circuit such as electronic circuit 205. In other examples, an insert may have interconnect features deposited on its surface.

In some examples, the variable aperture insert 200 may include a flexible substrate. This flexible substrate may be formed into a shape approximating a typical lens form in a similar manner previously discussed or by other means. However to add additional flexibility, the variable aperture insert 200 may include additional shape features such as radial cuts along its length. There may be multiple electronic components such as that indicated by 205 such as integrated circuits, discrete components, passive components, LEDs and such devices that may also be included. In some examples the bulk of the batteries and electrical components may be included in an encapsulated sub-unit which may be called an "e-ring".

A variable aperture portion 220 with an aperture 221 is also illustrated. The variable aperture portion 220 may be varied on command through the application of a current through the variable aperture insert which in turn may typically vary an electric field established across the device. In some examples, the variable aperture portion 220 comprises a thin layer comprising liquid crystal between two layers of transparent substrate. There may be numerous manners of electrically activating and controlling the variable aperture component, typically through action of the electronic circuit 205. The electronic circuit, 205 may receive signals in various manners and may also connect to sensing elements which may also be in the insert such as item 215. In some examples, the variable aperture insert may be encapsulated into a lens skirt 255, which may be comprised of hydrogel material or other suitable material to form an ophthalmic lens. In these examples the ophthalmic lens may be comprised of the lens skirt 255 and an encapsulated variable aperture insert 200 which may itself comprise layers or regions of liquid crystal material or comprising liquid crystal material and in some examples the layers may comprise polymer networked regions of interstitially located liquid crystal material.

Figure 3:
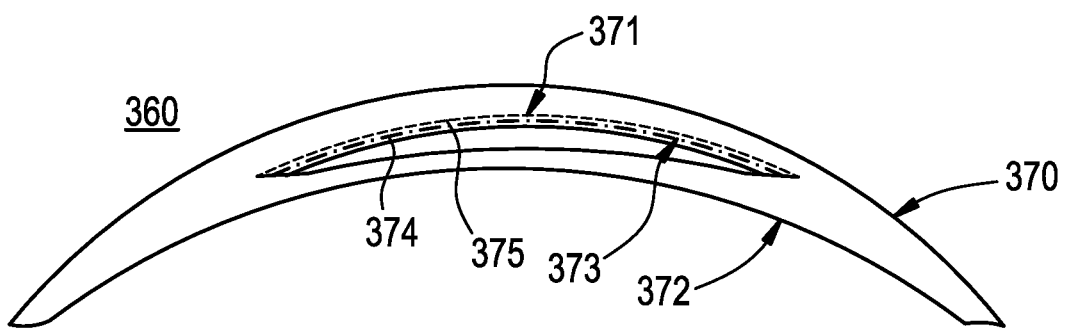
FIG. 3 illustrates a cross sectional view of an ophthalmic lens device embodiment with a variable aperture insert.

Referring to FIG. 3, an ophthalmic lens 360 is shown with an embedded variable aperture insert 371. The ophthalmic lens 360 may have a front curve surface 370 and a back curve surface 372. The variable aperture insert 371 may have a variable aperture portion 373 with an aperture 374. Portions of the variable aperture insert 371 may overlap with the optical zone of the ophthalmic lens 360.

A Variable Aperture Insert

A variable aperture insert may have a portion of its body in the optic zone which can be switched from being opaque to being transparent. When the region is switched to being opaque, light rays from the image are blocked at larger angles from the image. By closing down the size of the portion of the lens that allows light to pass through, the depth of focus for the lens device is increased. Thus an image will appear clearer, albeit with less intensity due to the blocked incident light. The Iris of a living organism's eye acts in a similar manner to control the amount of light that gets to the retina. When a living organism focuses on an object for detail, it may cause the iris to contract the opening that light proceeds through. The principal also works on lens such as camera lenses where a physical equivalent of the iris can be mechanically adjusted to alter the depth of focus versus the speed of exposure.

Figure 4:
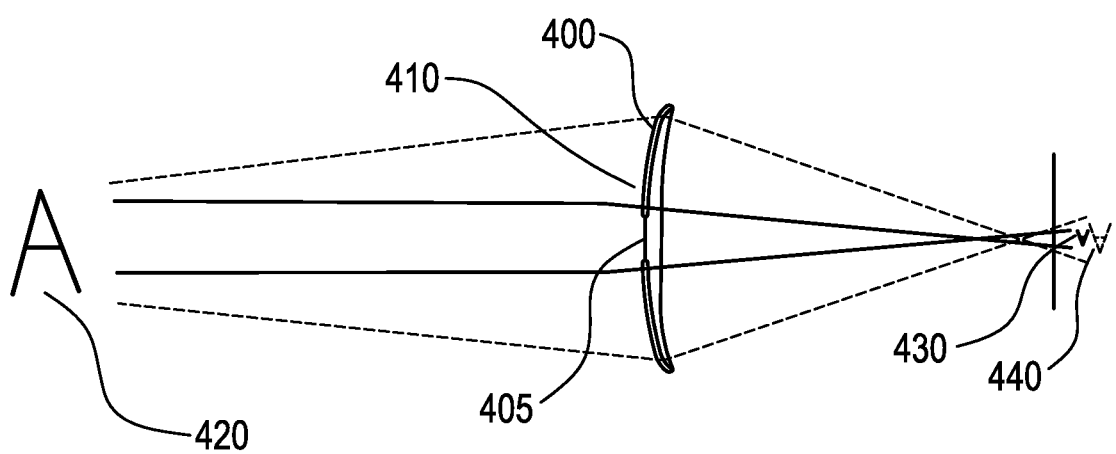
FIG. 4 illustrates an exemplary improvement in image quality when an electroactive lens system is switch to reduced aperture size.

Referring to FIG. 4. an exemplary depiction of the effect of aperture adjustment on image clarity. A lens 400 may include surface features which create an opaque mask 410 over a portion of the lens 400 that may typically comprise a portion of the optic zone creating an aperture 405. An image 420, may proceed through the lens 400 and due to the improvement of depth of field of the reduced aperture, have a clear image 430. Whereas, when the aperture 405 is expanded by switching the opaque mask 410 to transparent, the resulting image may be less clear 440.

Static implementations of smaller aperture lenses, including some examples contact lenses, have been made in the state of the art and give the user an improved ability to focus on detailed images such as text or surfaces in close up location. However, when a user does not need the improved clarity, such as when looking at long distance imagery, the lens with smaller aperture can yield dissatisfying results, where the image can have aspects of "tunnel" vision as well as the reduced intensity of images with smaller aperture.

Empirical studies with contact lenses equipped with static, reduced apertures may show improved image clarity under various lighting conditions. The studies also may show other factors of importance relating to the improvements that are possible with reduced aperture such as qualitative impressions that apertures on a human subject's eye surface afford best clarity when they are sized between approximately 1 mm and 2 mm in diameter. Furthermore, it may also be qualitatively assessed that the level of opaqueness of the mask that defines the aperture is also important to its function wherein leakage of light through the mask may very rapidly reduce the improvement in clarity. Fortunately, it may be quite possible to achieve improvements with maximized effectives with numerous types of controllable, electroactive systems that improve the state of the art by allow the user to switch between operating modes of decreased aperture with improved clarity and increased aperture with improved light levels and peripheral content.

Figure 5A:
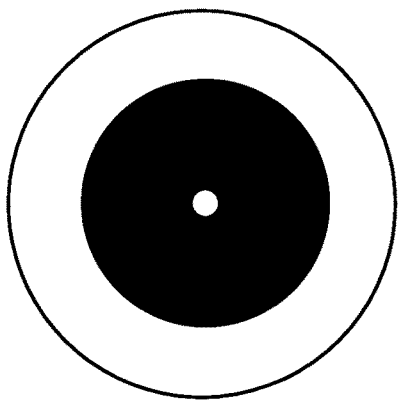
FIGS. 5A-D illustrate examples of different sizes and shapes of apertures according to the present disclosure.
Figure 5B:
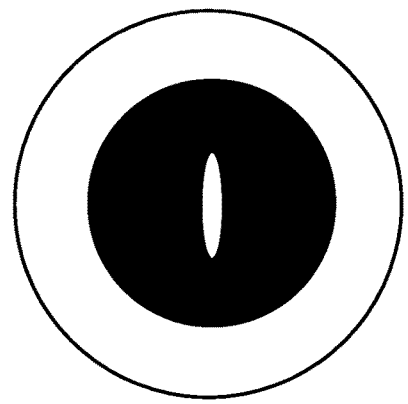
Figure 5C:
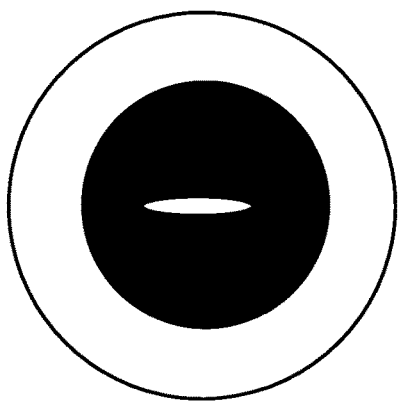
Figure 5D:
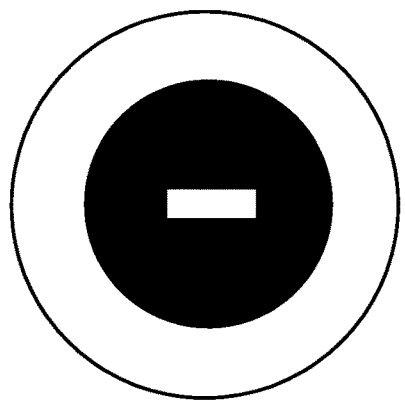
Figure 5E:
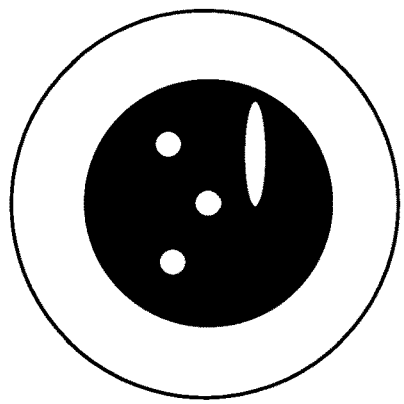
FIG. 5E illustrates an examples of multiple different sizes and shapes of apertures in a 1

Referring to FIGS. 5A-5E, examples of different types of aperture systems are illustrated. In FIG. 5A, a circular type aperture is illustrated. In FIG. 5B, a slit type aperture where the slit is aligned with the vertical plane is illustrated. In FIG. 5C, a slit type aperture where the slit is aligned with the horizontal plane is illustrated. In FIG. 5D a square shaped aperture aligned on the horizontal plane is illustrated. In FIG. 5E an exemplary composite aperture lens, where different types and numbers of apertures may be located in the same lens is illustrated. There may be many other types and shapes of apertures which may be imaged on various lens designs. In some examples, the apertures may be centered on a lens, in other examples they may be off-center. In other examples they may be programmed into various shapes when the opaque region of the lens can be controlled by software and can therefore be programmable. The size and shape of the aperture may be dynamic changing in time under various controls, as describe in following sections.

In some examples, the lens may be equipped with sensors that may sense the location of the lens on a user's eye surface. The sensing may be done in numerous manners, but in a non-limiting example a light source may be located at multiple locations close to the border between the iris of a user and the sclera, which may be the white part of the eye. Light may reflect from the two different regions differently and a light sensor capable of sensing different levels of reflection may be used to assess the centration of the lens. The light sensor, in a non-limiting example, may be a film such as CdS whose resistance may be sensitive to photon flux. By measuring resistivity at numerous locations along a device at the periphery of the lens, the edge of the sclera and iris may be determined. With a number of such sensing systems at the periphery of the lens, a controller may be able to calculate with a numerical algorithm whether the lens is located on the center of the user's eye.

Figure 6A:
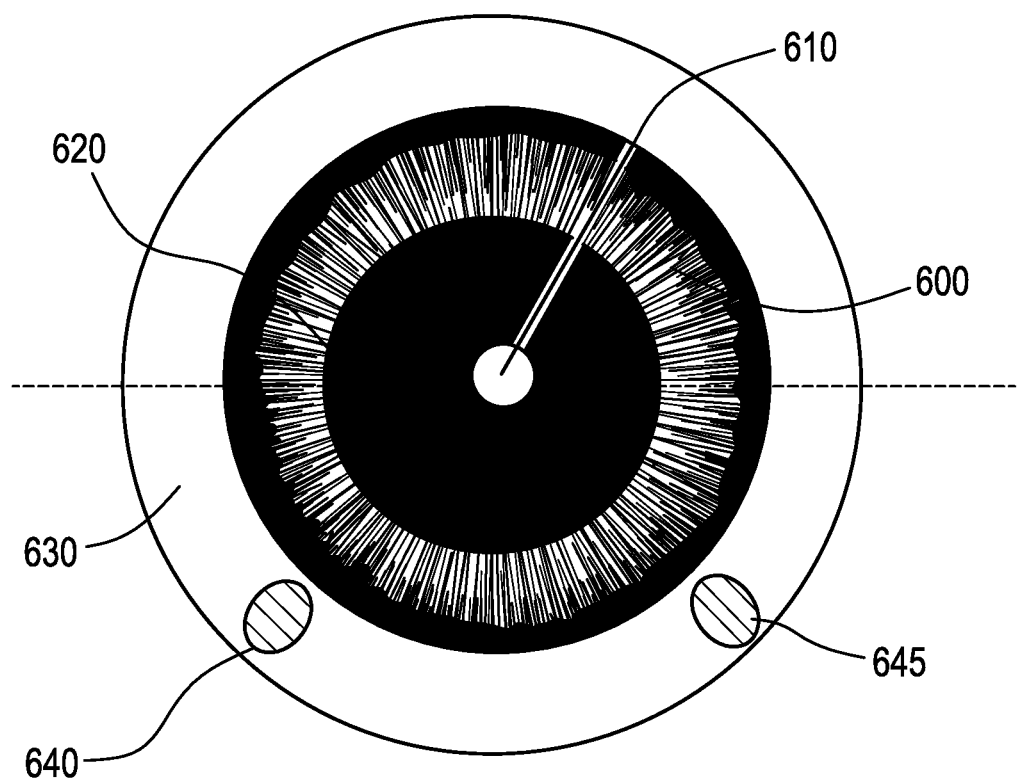
FIG. 6A illustrates aspects of a controllable variable aperture lens where the inside and outside of the blocking layer may be made transparent to allow the iris to be shown and to be adjusted as the user's pupil size changes.

In some examples, the controller may utilize the calculated centration of the lens on the eye to adjust the location of the aperture. Therefore, as the user utilizes the lens and moves, blinks or otherwise influences the location of the lens, the aperture of select examples can be moved in space to maintain a static centered location. In other examples, a similar sensing system may be used to locate the edge of the iris and the pupil. In some examples a lens system may adjust the size of the aperture both in the middle of the designed aperture and also on the outside edge so that the user's iris may be seen through transparent regions. Referring to FIG. 6A, an example where the outside edge of the masking pattern is made transparent up to the edge of the iris is illustrated. When this adjustment is made it may be possible to adjust the blocking layer in concert with the user's pupil size as it naturally varies. An aperture 610 may be formed by making the region transparent. In some examples, the aperture 610 may be a region of the lens that is devoid of material that can block light in either switched form. In following sections different types of apertures will be discussed. The iris 600 of the user is illustrated. The edge between the Iris 600 and the blocking mask 620 may be adjusted to allow the natural iris pattern to be visible through the blocking mask layer. A lens skirt 630 is illustrated with a first alignment mark 640 and a second alignment mark 645.

In some examples, the blocking mask layer may be formed from liquid crystal layers. In some examples, the liquid crystal layer may be aligned as a nematic twist as is typical in LC displays with polarizing layers and electrode layers so that individual pixels may be established across the lens surface. The stack of liquid crystal electrodes and polarization filters allow for a pixel to be made transparent or opaque depending on the application of field to the electrodes corresponding to pixel elements of the lens. A controller can apply electrical potential to a plurality of pixels across the lens surface so that an aperture in the middle of a blocking mask layer may be formed. In some example, the liquid crystal element may be configured into a bistable configuration, so that the application of a signal voltage can flip the pixel from transparent to opaque or from opaque to transparent without requiring the signal voltage to be maintained over time.

In some other examples the blocking layer may be formed by a layer of liquid crystal polymer liquid crystal where individual bubbles of liquid crystal material within a polymerized matrix can be aligned such that the index of refraction within the bubbles matches that of the polymer region. In this case the bubbles may be transparent to light passing through the layer. When the electrodes are biased, the liquid crystal molecules within the bubbles can be aligned such that the index of refraction felt by light traversing the bubble is different than the polymer layer. At the interface of the bubble and the polymer layer, the difference in index of refraction can cause an appreciable amount of scattering of light. The lens layer can be made opaque by the application of potential across the electrodes. In pixels where no voltage is applied, the light may proceed through the lens in the aperture formed in this manner.

Figure 6B:
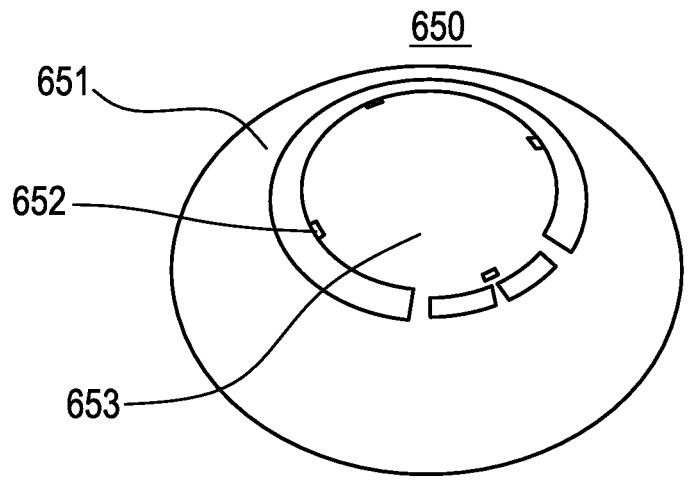
FIG. 6B illustrates an exemplary device for a controllable variable aperture lens comprising photochromic materials where the photochromic device is in a state not blocking light.

In some examples, the light blocking element may be formed of layers comprising photochromic materials. In some examples, irradiating a photochromic dye at a particular wavelength converts that absorbance of the dye, changing it from transparent to opaque for example. Referring to FIG. 6B, illustration 650 shows a photochromic dye which is transparent to visible light. An "e-ring" 651 may control photodiodes 652 to either be shining light or not shining light depending on the nature of the type of photochromic dye. The resulting light blocking element 653 may then be transparent to light and the aperture may be referred to as "open". In some examples the photochromic dye may be sensitive to reasonably narrow bands of irradiation. In some examples, the narrow bands of radiation may be present in the infra-red region of the spectrum. In some examples, different regions may be formed with different photochromic dyes, such as for example different concentric annular regions. In these examples, one particular photodiode 652 may be different from another in terms of the frequency band of photons that are emitted. The size of the aperture may be variable when different wavelengths are used. In some example, the output of the photodiode may be coupled to light pipes or other light scattering devices that can spread out the light into the region of the photochromic dye.

Figure 6C:
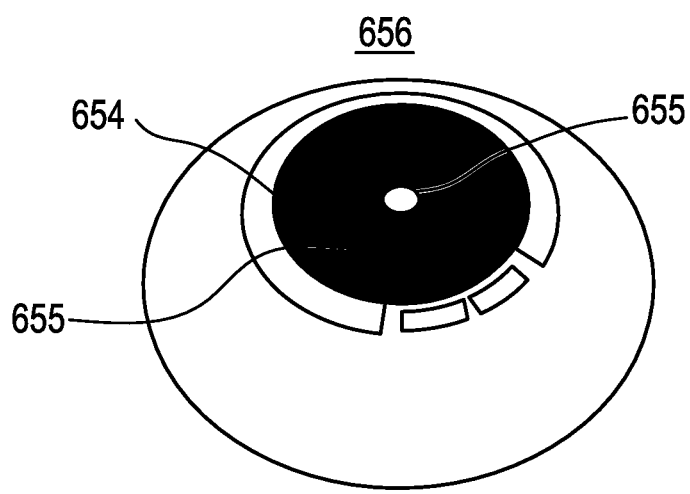
FIG. 6C illustrates an exemplary device for a controllable variable aperture lens comprising photochromic materials where the photochromic device is in a state blocking light.
Figure 6D:
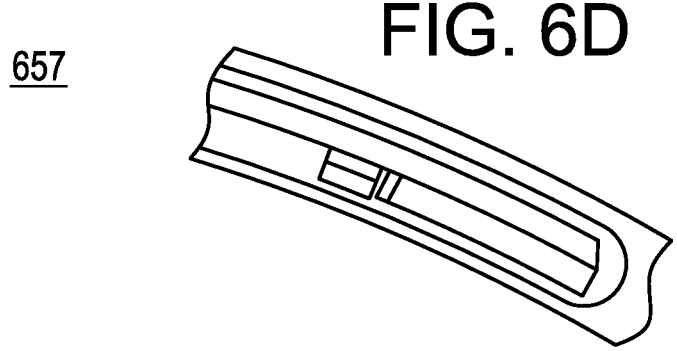
FIG. 6D illustrates an exemplary cross section of a variable aperture lens.
Figure 6E:
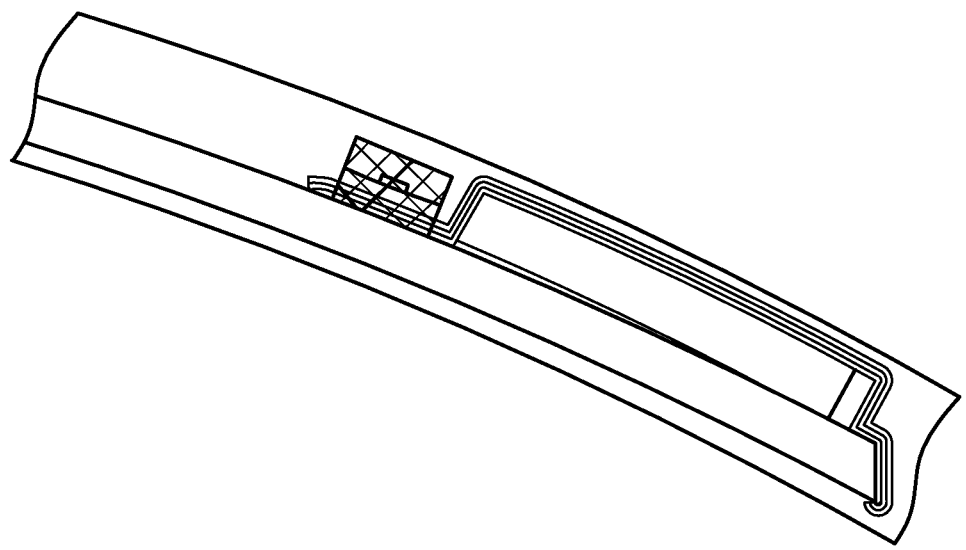
FIG. 6E illustrates an exemplary cross section of a variable aperture lens.
Figure 6F:
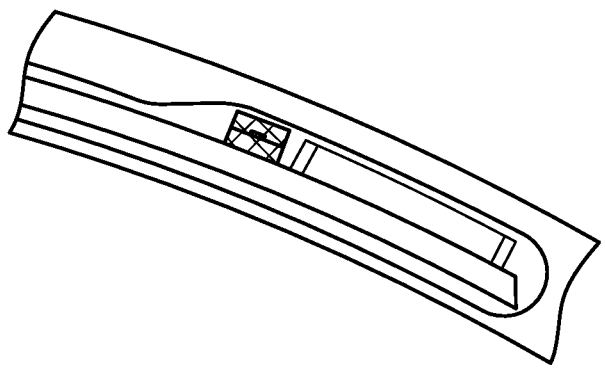
FIG. 6F illustrates an exemplary cross section of a variable aperture lens.

Referring to FIG. 6C, the opposite state is illustrated where the photochromic dye has become transparent. In illustration 656, the opposite state of the photodiodes is programmed. Under this condition, the photochromic dye may become opaque 655. The photochromic dye may only be located outside the region of the aperture 657. There may be numerous manners of configuring a lens for a photochromic dye based aperture. In a non-limiting example, a process to create a lens based on a photochromic dye based aperture may start with dispensing a small amount of a contact lens based monomer, such as a hydrogel, which is clear from the presence of photochromic dye. The small deposit can be processed to form the small gelled central aperture region of the lens. Next a region of monomer including photochromic dye may be applied around the central aperture region. It too may be gelled at least partially. Next the e-ring device may be added around to the growing lens body. In these types of examples, the e-ring device may be a completed device that is completely hermetically sealed which just emits light from its body that activates the photochromic dye or regions of different photochromic dye. The resulting structure may be encapsulated with a hydrogel region to complete the lens. Referring to FIG. 6D, illustration 657 the resulting lens is illustrated in cross section with various layers and components enumerated. Alternative cross sections 658 and 659 are illustrated in FIG. 6E and FIG. 6F respectively which also enumerate the layer and device options.

Figure 6G:
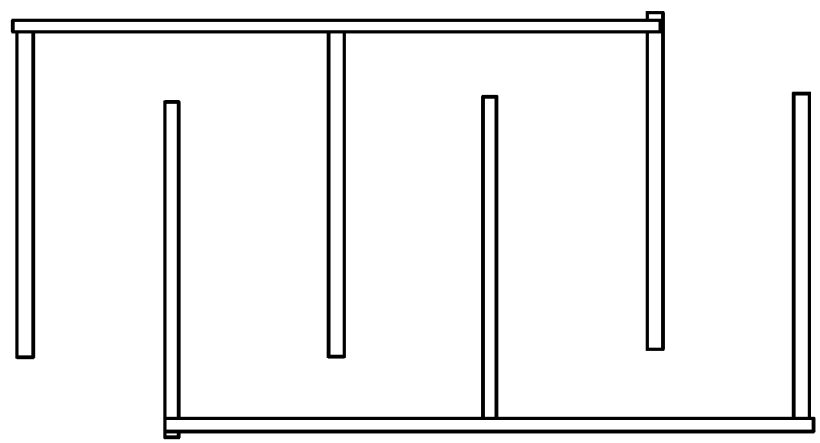
FIG. 6G illustrates an interdigitated biasing element for a variable aperture lens.

In some examples, the light blocking layer may be made from electrochromic material. In these examples, transparent electrodes may be aligned across the top and bottom of the electrochromic layer. Application of a field across the electrochromic layer may modulate the transmittance of the layer. Since electrochromic layers do not conduct a significant amount of current, in some examples, it may be possible to bias the layer with finger structures where thin metal finger layers mesh in between each other. Referring to FIG. 6G an exemplary illustration of interdigitated metal finger electrodes may be found. For the same reason, due to the low current consumption of electrochromic layers, it may be possible to bias or energize them along the edges of regions of the electrochromic layer.

Figure 6H:
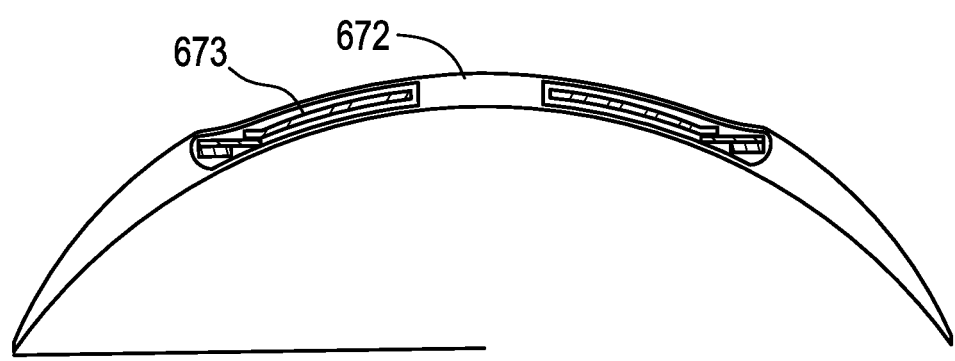
FIG. 6H illustrates an exemplary cross section of a variable aperture lens with a central hole element.

In still further examples, the central aperture of the lens device may be formed with the absence of all materials except for the hydrogel skirt material. Referring to FIG. 6H an exemplary cross section 671 with exemplary specification values is illustrated showing a central hole region 672. Neighboring the central hole region 672 is a variable aperture region 673. The variable aperture region 673 may be any of the previously discussed light blocking device types, for example including liquid crystal, photochromics, electrochromics and the like. The design with a central hole region 672 may have numerous other advantages, including in a non-limiting perspective the ability for oxygen to permeate the central hole region 672 hydrogel layer abundantly. This will tend to keep the level of oxygen at the eye surface under the contact lens device at relatively high levels. Furthermore, there may be advantages related to the overall thickness of the resulting lens. In some examples, because only hydrogel is found in the central hole region 672, the transmittance of light may be significantly enhanced relative to other designs.

In some other examples, there may be other types of devices which may be useful to create electroactive transmittance modulating regions. For example, a liquid meniscus approach based on small pixels comprising one of an oil or aqueous phase having a light blocking dye. An electrical signal may spread the dyed fluid across the pixel turning off its transmittance.

In some other examples, a liquid meniscus type lens may be configure having chambers into which a dyed or undyed component may be moved based on biasing of the chamber electrodes.

In some examples, the type of devices that operate in an organic LED (OLED) display may be useful to configure a light blocking region.

In some examples the light blocking region may be formed of films that have electromagnetic or magnetic based opacity to form sheets or pixelated regions of individually control opacity.

There may be numerous types of sensors that may be desirable to incorporate into the aperture lens type. For example numerous types of censor may monitor and measure the degree of centration of the lens based on light reflection detection based on resistance, capacitance, or transistor based transconductance. In some other examples, photodiodes equipped with filters consistent with the color of the iris of the individual may be useful.

Other sensors may include convergence sensors which can assess the nature of the direction of focus of the lenses. In some example there may be electrical motor sensors that may sense the degree to which nerves and muscles in the eye of the user are electrically active. Such sensing may be used to trigger a change in the variable aperture setting for example.

There may be numerous uses for a variable aperture contact lens including in non-limiting sense. The lenses may support participants in sports activities. The lenses may support workers of various kinds where close up focus and long term vision is necessary. Various types of manufacturing and assembly jobs may be assisted with a variable aperture contact lens that can help with clarity of focused detail.

Transparent electrodes of high transmittance quality may be very desirable. In some examples, transparent electrodes may be formed of ITO (Indium Tin Oxide).

Sacrificial substrates made of such materials as silicon may be used to shape and form an ITO electrode or array of micro electrodes made of ITO. The ITO may be processed at high temperatures such as approximately 400 C annealing conditions. Such processing may result in very transparent high quality high conductivity electrodes. The resulting electrode surface may then be transferred to an optically consistent substrate and the support silicon or similar material may then be etched away to yield a high quality optical piece with imaged or pixelated electrode pieces.

Lenses configure to have a plurality of apertures may be formed where the individual holes support high depth of field whereas the plurality of features may minimize tunnel vision effects and lower intensity effects.

In some examples, the light blocking region may be configured of electroactive physical apertures. In some examples, the electroactive physical aperture may operate in a similar manner to living organism's iris operation. In a non-limiting example, electroactive elastomeric materials may create movement of elastomeric light blocking materials which may be stretched into large apertures or shrunk to small apertures. Other electroactive actuators such as electroactive, thermoactive memory metals may be used to active a physical aperture lens. Piezoelectric transducers may also provide actuation for movement, stressing or pressurization.

Materials

Microinjection molding examples may include, for example, a poly (4-methylpent-1-ene) copolymer resin are used to form lenses with a diameter of between about 6 mm to 10 mm and a front surface radius of between about 6 mm and 10 mm and a rear surface radius of between about 6 mm and 10 mm and a center thickness of between about 0.050 mm and 1.0 mm. Some examples include an insert with diameter of about 8.9 mm and a front surface radius of about 7.9 mm and a rear surface radius of about 7.8 mm and a center thickness of about 0.200 mm and an edge thickness of about 0.050 mm.

The variable aperture insert 104 illustrated in FIG. 1 may be placed in a mold part utilized to form an ophthalmic lens. The material of mold parts may include, for example, a polyolefin of one or more of: polypropylene, polystyrene, polyethylene, polymethyl methacrylate, and modified polyolefins. Other molds may include a ceramic or metallic material.

A preferred alicyclic co-polymer contains two different alicyclic polymers. Various grades of alicyclic co-polymers may have glass transition temperatures ranging from 105° C. to 160° C.

In some examples, the molds of the present invention may contain polymers such as polypropylene, polyethylene, polystyrene, polymethyl methacrylate, modified polyolefins containing an alicyclic moiety in the main chain and cyclic polyolefins. This blend may be used on either or both mold halves, where it is preferred that this blend is used on the back curve and the front curve consists of the alicyclic co-polymers.

In some preferred methods of making molds according to the present invention, injection molding is utilized according to known techniques, however, examples may also include molds fashioned by other techniques including, for example: lathing, diamond turning, forming, or laser cutting.

Typically, lenses are formed on at least one surface of both mold parts; back curve mold 101 and front curve mold 102. However, in some examples, one surface of a lens may be formed from a mold part and another surface of a lens may be formed using a lathing method, or other methods.

In some examples, a preferred lens material includes a silicone containing component. A "silicone-containing component" is one that contains at least one [—Si—O—] unit in a monomer, macromer or prepolymer. Preferably, the total Si and attached O are present in the silicone-containing component in an amount greater than about 20 weight percent, and more preferably greater than 30 weight percent of the total molecular weight of the silicone-containing component. Useful silicone-containing components preferably comprise polymerizable functional groups such as acrylate, methacrylate, acrylamide, methacrylamide, vinyl, N-vinyl lactam, N-vinylamide, and styryl functional groups.

In some examples, the ophthalmic lens skirt, also called an insert-encapsulating layer, that surrounds the insert may be comprised of standard hydrogel ophthalmic lens formulations. Exemplary materials with characteristics that may provide an acceptable match to numerous insert materials may include, the Narafilcon family (including Narafilcon A and Narafilcon B), and the Etafilcon family (including Etafilcon A). A more technically inclusive discussion follows on the nature of materials consistent with the art herein. One ordinarily skilled in the art may recognize that other material other than those discussed may also form an acceptable enclosure or partial enclosure of the sealed and encapsulated inserts and should be considered consistent and included within the scope of the claims.

Suitable silicone containing components include compounds of Formula I

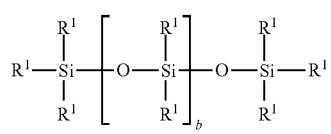

where $R^1$ is independently selected from monovalent reactive groups, monovalent alkyl groups, or monovalent aryl groups, any of the foregoing which may further comprise functionality selected from hydroxy, amino, oxa, carboxy, alkyl carboxy, alkoxy, amido, carbamate, carbonate, halogen or combinations thereof; and monovalent siloxane chains comprising 1-100 Si—O repeat units which may further comprise functionality selected from alkyl, hydroxy, amino, oxa, carboxy, alkyl carboxy, alkoxy, amido, carbamate, halogen or combinations thereof;

where b=0 to 500, where it is understood that when b is other than 0, b is a distribution having a mode equal to a stated value;

wherein at least one $R^1$ comprises a monovalent reactive group, and in some examples between one and 3 $R^1$ comprise monovalent reactive groups.

As used herein "monovalent reactive groups" are groups that may undergo free radical and/or cationic polymerization. Non-limiting examples of free radical reactive groups include (meth)acrylates, styryls, vinyls, vinyl ethers, $C_{1-6}$alkyl(meth)acrylates, (meth)acrylamides, $C_{1-6}$alkyl (meth)acrylamides, N-vinyllactams, N-vinylamides, $C_{2-12}$alkenyls, $C_{2-12}$alkenylphenyls, $C_{2-12}$alkenylnaphthyls, $C_{2-6}$alkenylphenyl$C_{1-6}$alkyls, O-vinylcarbamates and O-vinylcarbonates. Non-limiting examples of cationic reactive groups include vinyl ethers or epoxide groups and mixtures thereof. In one embodiment the free radical reactive groups comprises (meth)acrylate, acryloxy, (meth)acrylamide, and mixtures thereof.

Suitable monovalent alkyl and aryl groups include unsubstituted monovalent $C_1$ to $C_{16}$alkyl groups, $C_6$-$C_{14}$ aryl groups, such as substituted and unsubstituted methyl, ethyl, propyl, butyl, 2-hydroxypropyl, propoxypropyl, polyethyleneoxypropyl, combinations thereof and the like.

In one example, b is zero, one $R^1$ is a monovalent reactive group, and at least 3 $R^1$ are selected from monovalent alkyl groups having one to 16 carbon atoms, and in another example from monovalent alkyl groups having one to 6 carbon atoms. Non-limiting examples of silicone components of this embodiment include 2-methyl-,2-hydroxy-3-[3-[1,3,3,3-tetramethyl-1-[(trimethylsilyl)oxy]disiloxanyl] propoxy]propyl ester ("SiGMA"), 2-hydroxy-3-methacryloxypropyloxypropyl-tris (trimethylsiloxy)silane, 3-methacryloxypropyltris(trimethylsiloxy)silane ("TRIS"), 3-methacryloxypropylbis(trimethylsiloxy)methylsilane and 3-methacryloxypropylpentamethyl disiloxane.

In another example, b is 2 to 20, 3 to 15 or in some examples 3 to 10; at least one terminal $R^1$ comprises a monovalent reactive group and the remaining $R^1$ are selected from monovalent alkyl groups having 1 to 16 carbon atoms, and in another embodiment from monovalent alkyl groups having 1 to 6 carbon atoms. In yet another embodiment, b is 3 to 15, one terminal $R^1$ comprises a monovalent reactive group, the other terminal $R^1$ comprises a monovalent alkyl group having 1 to 6 carbon atoms and the remaining $R^1$ comprise monovalent alkyl group having 1 to 3 carbon atoms. Non-limiting examples of silicone components of this embodiment include (mono-(2-hydroxy-3-methacryloxypropyl)-propyl ether terminated polydimethylsiloxane (400-1000 MW)) ("OH-mPDMS"), monomethacryloxypropyl terminated mono-n-butyl terminated polydimethylsiloxanes (800-1000 MW), ("mPDMS").

In another example, b is 5 to 400 or from 10 to 300, both terminal $R^1$ comprise monovalent reactive groups and the remaining $R^1$ are independently selected from monovalent alkyl groups having 1 to 18 carbon atoms, which may have ether linkages between carbon atoms and may further comprise halogen.

In one example, where a silicone hydrogel lens is desired, the lens of the present invention will be made from a reactive mixture comprising at least about 20 and preferably between about 20 and 70% wt silicone containing components based on total weight of reactive monomer components from which the polymer is made.

In another embodiment, one to four $R^1$ comprises a vinyl carbonate or carbamate of the formula:

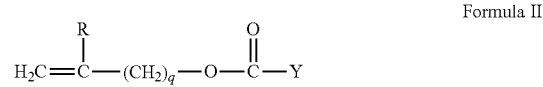

Formula II wherein: Y denotes O—, S— or NH—;

R denotes, hydrogen or methyl; d is 1, 2, 3 or 4; and q is 0 or 1.

The silicone-containing vinyl carbonate or vinyl carbamate monomers specifically include: 1,3-bis[4-(vinyloxycarbonyloxy)but-1-yl]tetramethyl-disiloxane; 3-(vinyloxycarbonylthio) propyl-[tris (trimethylsiloxy)silane]; 3-[tris (trimethylsiloxy)silyl] propyl allyl carbamate; 3-[tris (trimethylsiloxy)silyl] propyl vinyl carbamate; trimethylsilylethyl vinyl carbonate; trimethylsilylmethyl vinyl carbonate, and

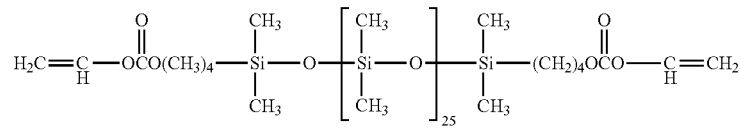

Where biomedical devices with modulus below about 200 are desired, only one $R^1$ shall comprise a monovalent reactive group and no more than two of the remaining $R^1$ groups will comprise monovalent siloxane groups.

Another class of silicone-containing components includes polyurethane macromers of the following formulae:

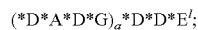

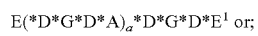

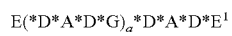   Formulae IV-VI wherein:

D denotes an alkyl diradical, an alkyl cycloalkyl diradical, a cycloalkyl diradical, an aryl diradical or an alkylaryl diradical having 6 to 30 carbon atoms, G denotes an alkyl diradical, a cycloalkyl diradical, an alkyl cycloalkyl diradical, an aryl diradical or an alkylaryl diradical having 1 to 40 carbon atoms and which may contain ether, thio or amine linkages in the main chain;

* denotes a urethane or ureido linkage;
a is at least 1;
A denotes a divalent polymeric radical of formula:

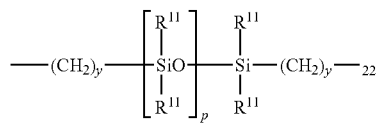

Formula VII $R^{11}$ independently denotes an alkyl or fluoro-substituted alkyl group having 1 to 10 carbon atoms, which may contain ether linkages between carbon atoms; y is at least 1; and p provides a moiety weight of 400 to 10,000; each of E and $E^1$ independently denotes a polymerizable unsaturated organic radical represented by formula:

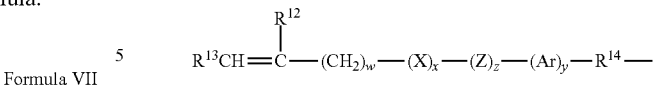

Formula VIII wherein: $R^{12}$ is hydrogen or methyl; $R^{13}$ is hydrogen, an alkyl radical having 1 to 6 carbon atoms, or a —CO—Y—$R^{15}$ radical wherein Y is —O—, Y—S— or —NH—; $R^{14}$ is a divalent radical having 1 to 12 carbon atoms; X denotes —CO— or —OCO—; Z denotes —O— or —NH—; Ar denotes an aromatic radical having 6 to 30 carbon atoms; w is 0 to 6; x is 0 or 1; y is 0 or 1; and z is 0 or 1.

A preferred silicone-containing component is a polyurethane macromer represented by the following formula:

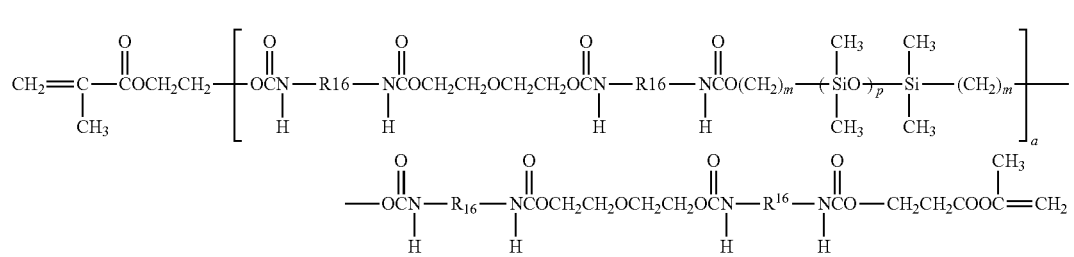

Formula IX wherein $R^{16}$ is a diradical of a diisocyanate after removal of the isocyanate group, such as the diradical of isophorone diisocyanate. Another suitable silicone containing macromer is compound of formula X (in which x+y is a number in the range of 10 to 30) formed by the reaction of fluoroether, hydroxy-terminated polydimethylsiloxane, isophorone diisocyanate and isocyanatoethylmethacrylate.

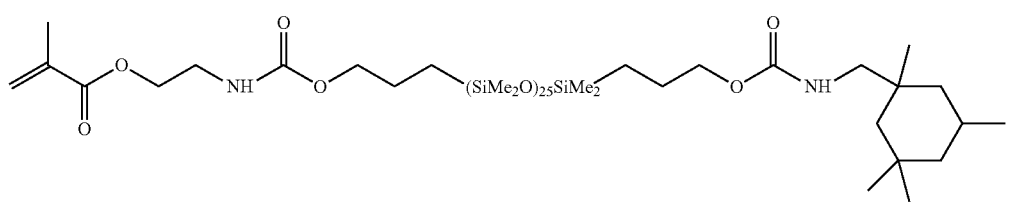

Formula X

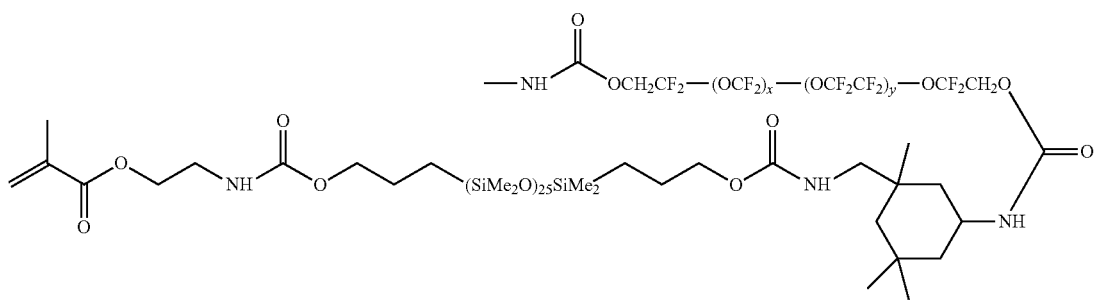

Other silicone containing components suitable for use in this invention include macromers containing polysiloxane, polyalkylene ether, diisocyanate, polyfluorinated hydrocarbon, polyfluorinated ether and polysaccharide groups; polysiloxanes with a polar fluorinated graft or side group having a hydrogen atom attached to a terminal difluoro-substituted carbon atom; hydrophilic siloxanyl methacrylates containing ether and siloxanyl linkanges and crosslinkable monomers containing polyether and polysiloxanyl groups. Any of the foregoing polysiloxanes may also be used as the silicone containing component in the present invention.

Liquid Crystal Materials

There may be numerous materials that may have characteristics consistent with the liquid crystal layer types that have been discussed herein. It may be expected that liquid crystal materials with favorable toxicity may be preferred and naturally derived cholesteryl based liquid crystal materials may be useful. In other examples, the encapsulation technology and materials of ophthalmic inserts may allow a broad choice of materials that may include the LCD display related materials which may typically be of the broad categories related to nematic or cholesteric N or smectic liquid crystals or liquid crystal mixtures. Commercially available mixtures such as Merck Specialty chemicals Licristal mixtures for TN, VA, PSVA, IPS and FFS applications and other commercially available mixtures may form a material choice to form a liquid crystal layer.

In a non-limiting sense, mixtures or formulations may comprise the following liquid crystal materials: 1-(trans-4-Hexylcyclohexyl)-4-isothiocyanatobenzene liquid crystal, benzoic acid compounds including (4-Octylbenzoic acid and 4-Hexylbenzoic acid), carbonitrile compounds including (4'-Pentyl-4-biphenylcarbonitrile, 4'-Octyl-4-biphenylcarbonitrile, 4'-(Octyloxy)-4-biphenylcarbonitrile, 4'-(Hexyloxy)-4-biphenylcarbonitrile, 4-(trans-4-Pentylcyclohexyl) benzonitrile, 4'-(Pentyloxy)-4-biphenylcarbonitrile, 4'-Hexyl-4-biphenylcarbonitrile), and 4,4'-Azoxyanisole.

In a non-limiting sense, formulations showing particularly high birefringence of $n_{par}-n_{perp}>0.3$ at room temperature may be used as a liquid crystal layer forming material. For example, such formulation referred to as W1825 may be as available from AWAT and BEAM Engineering for Advanced Measurements Co. (BEAMCO).

There may be other classes of liquid crystal materials that may be useful for the inventive concepts here. For example, ferroelectric liquid crystals may provide function for electric field oriented liquid crystal examples, but may also introduce other effects such as magnetic field interactions. Interactions of electromagnetic radiation with the materials may also differ.

Alignment Layer Materials:

In many of the examples that have been described, the liquid crystal layers within ophthalmic lenses may need to be aligned in various manners at insert boundaries. The alignment, for example, may be parallel or perpendicular to the boundaries of the inserts, and this alignment may be obtained by proper processing of the various surfaces. The processing may involve coating the substrates of the inserts that contain the liquid crystal (LC) by alignment layers. Those alignment layers are described herein.

A technique commonly practiced in liquid crystal based devices of various types may be the rubbing technique. This technique may be adapted to account for the curved surfaces such as the ones of the insert pieces used for enclosing the liquid crystal. In an example, the surfaces may be coated by a Polyvinyl Alcohol (PVA) layer. For example, a PVA layer may be spin coated using a 1 weight percent aqueous solution. The solution may be applied with spin coating at 1000 rpm for time such as approximately 60 s, and then dried. Subsequently, the dried layer may then be rubbed by a soft cloth. In a non-limiting example, the soft cloth may be velvet.

Photo-alignment may be another technique for producing alignment layers upon liquid crystal enclosures. In some examples, photo-alignment may be desirable due to its non-contact nature and the capability of large scale fabrication. In a non-limiting example, the photo-alignment layer used in the liquid crystal variable aperture portion may be comprised of a dichroic azobenzene dye (azo dye) capable of aligning predominantly in the direction perpendicular to the polarization of linear polarized light of typically UV wavelengths. Such alignment may be a result of repetitive trans-cis-trans photoisomerization processes.

As an example, PAAD series azobenzene dyes may be spin coated from a 1 weight percent solution in DMF at 3000 rpm for 30 s. Subsequently, the obtained layer may be exposed to a linear polarized light beam of a UV wavelength (such as for example, 325 nm, 351 nm, 365 nm) or even a visible wavelength (400-500 nm). The source of the light may take various forms. In some examples, light may originate from laser sources for example. Other light sources such as LEDs, halogen and incandescent sources may be other non-limiting examples. Either before or after the various forms of light are polarized in the various patterns as appropriate, the light may be collimated in various manners such as through the use of optical lensing devices. Light from a laser source may inherently have a degree of collimation, for example.

A large variety of photoanisotropic materials are known currently, based on azobenzene polymers, polyesthers, photo-crosslinkable polymer liquid crystals with mesogenic 4-(4-methoxycinnamoyloxy)biphenyl side groups and the like. Examples of such materials include sulfonic bisazodye SD1 and other azobenzene dyes, particularly, PAAD-series materials available from BEAM Engineering for Advanced Measurements Co. (BEAMCO), Poly(vinyl cinnamates), and others.

In some examples, it may be desirable to use water or alcohol solutions of PAAD series azo dyes. Some azobenzene dyes, for example, Methyl Red, may be used for photoalignment by directly doping a liquid crystal layer. Exposure of the azobenzene dye to a polarized light may cause diffusion and adhesion of the azo dyes to and within the bulk of the liquid crystal layer to the boundary layers creating desired alignment conditions.

Azobenzene dyes such as Methyl Red may also be used in combination with a polymer, for example, PVA. Other photoanisotropic materials capable of enforcing alignment of adjacent layers of liquid crystals may be acceptable are known currently. These examples may include materials based on coumarines, polyesthers, photo-crosslinkable polymer liquid crystals with mesogenic 4-(4-methoxycinnamoyloxy)-biphenyl side groups, poly(vinyl cinnamates), and others. The photo-alignment technology may be advantageous for examples comprising patterned orientation of liquid crystal.

In another example of producing alignment layers, the alignment layer may be obtained by vacuum deposition of silicon oxide (SiOx where $1<=X<=2$) on the insert piece substrates. For example, $SiO_2$ may be deposited at low pressure such as $\sim 10^{-6}$ mbar. It may be possible to provide alignment features at a nanoscaled size that are injection molded into with the creation of the front and back insert pieces. These molded features may be coated in various manners with the materials that have been mentioned or other materials that may directly interact with physical alignment features and transmit the alignment patterning into alignment orientation of liquid crystal molecules.

Ion-beam alignment may be another technique for producing alignment layers upon liquid crystal enclosures. In some examples, a collimated argon ion or focused gallium ion beam may be bombarded upon the alignment layer at a defined angle/orientation. This type of alignment may also be used to align silicon oxide, diamond-like-carbon (DLC), polyimide and other alignment materials.

Still further examples may relate to the creation of physical alignment features to the insert pieces after they are formed. Rubbing techniques as are common in other Liquid Crystal based art may be performed upon the molded surfaces to create physical grooves. The surfaces may also be subjected to a post-molding embossing process to create small grooved features upon them. Still further examples may derive from the use of etching techniques which may involve optical patterning processes of various kinds.

Dielectric Materials

Dielectric films and dielectrics are described herein. By way of non-limiting examples, the dielectric film or dielectrics used in the liquid crystal variable aperture portion possess characteristics appropriate to the invention described herein. A dielectric may comprise one or more material layers functioning alone or together as a dielectric. Multiple layers may be used to achieve dielectric performance superior to that of a single dielectric.

The dielectric may permit a defect-free insulating layer at a thickness desired for the discretely variable aperture portion, for example, between 1 and 10 μm. A defect may be referred to as a pinhole, as is known by those skilled in the art to be a hole in the dielectric permitting electrical and/or chemical contact through the dielectric. The dielectric, at a given thickness, may meet requirements for breakdown voltage, for example, that the dielectric should withstand 100 volts or more.

The dielectric may allow for fabrication onto curved, conical, spherical, and complex three-dimensional surfaces (e.g., curved surfaces or non-planar surfaces). Typical methods of dip- and spin-coating may be used, or other methods may be employed.

The dielectric may resist damage from chemicals in the variable aperture portion, for example the liquid crystal or liquid crystal mixture, solvents, acids, and bases or other materials that may be present in the formation of the liquid crystal region. The dielectric may resist damage from infrared, ultraviolet, and visible light. Undesirable damage may include degradation to parameters described herein, for example, breakdown voltage and optical transmission. The dielectric may resist permeation of ions. The dielectric may prevent electromigration, dendrite growth, and other degradations of the underlying electrodes. The dielectric may adhere to an underlying electrode and/or substrate, for example, with the use of an adhesion promotion layer. The dielectric may be fabricated using a process which allows for low contamination, low surface defects, conformal coating, and low surface roughness.

The dielectric may possess relative permittivity or a dielectric constant which is compatible with electrical operation of the system, for example, a low relative permittivity to reduce capacitance for a given electrode area. The dielectric may possess high resistivity, thereby permitting a very small current to flow even with high applied voltage. The dielectric may possess qualities desired for an optic device, for example, high transmission, low dispersion, and refractive index within a certain range. Example, non-limiting, dielectric materials, include one or more of Parylene-C, Parylene-HT, Silicon Dioxide, Silicon Nitride, and Teflon AF.

Electrode Materials

Electrodes are described herein for applying an electric potential for achieving an electric field across the liquid crystal region. An electrode generally comprises one or more material layers functioning alone or together as an electrode.

The electrode may adhere to an underlying substrate, dielectric coating, or other objects in the system, perhaps with the use of an adhesion promoter (e.g., methacryloxypropyltrimethoxysilane). The electrode may form a beneficial native oxide or be processed to create a beneficial oxide layer. The electrode may be transparent, substantially transparent or opaque, with high optical transmission and little reflection. The electrode may be patterned or etched with known processing methods. For example, the electrodes may be evaporated, sputtered, or electroplated, using photolithographic patterning and/or lift-off processes.

The electrode may be designed to have suitable resistivity for use in the electrical system described herein, for example, meeting the requirements for resistance in a given geometric construct.

The electrodes may be manufactured from one or more of indium tin oxide (ITO), aluminum-doped zinc oxide (AZO), gold, stainless steel, chrome, graphene, graphene-doped layers and aluminum. It will be appreciated that this is not an exhaustive list.

The electrodes may be used to establish an electric field in a region between the electrodes. In some examples, there may be numerous surfaces upon which electrodes may be formed. It may be possible to place electrodes on any or all of the surfaces that are defined, and an electric field may be established in the region between any of the surfaces upon which electrodes have been formed by application of electric potential to at least those two surfaces.

Processes

The following method steps are provided as examples of processes that may be implemented according to some aspects of the present invention. It should be understood that the order in which the method steps are presented is not meant to be limiting and other orders may be used to implement the invention. In addition, not all of the steps are required to implement the present invention and additional steps may be included in various examples of the present invention. It may be obvious to one skilled in the art that additional examples may be practical, and such methods are well within the scope of the claims.

Figure 7:
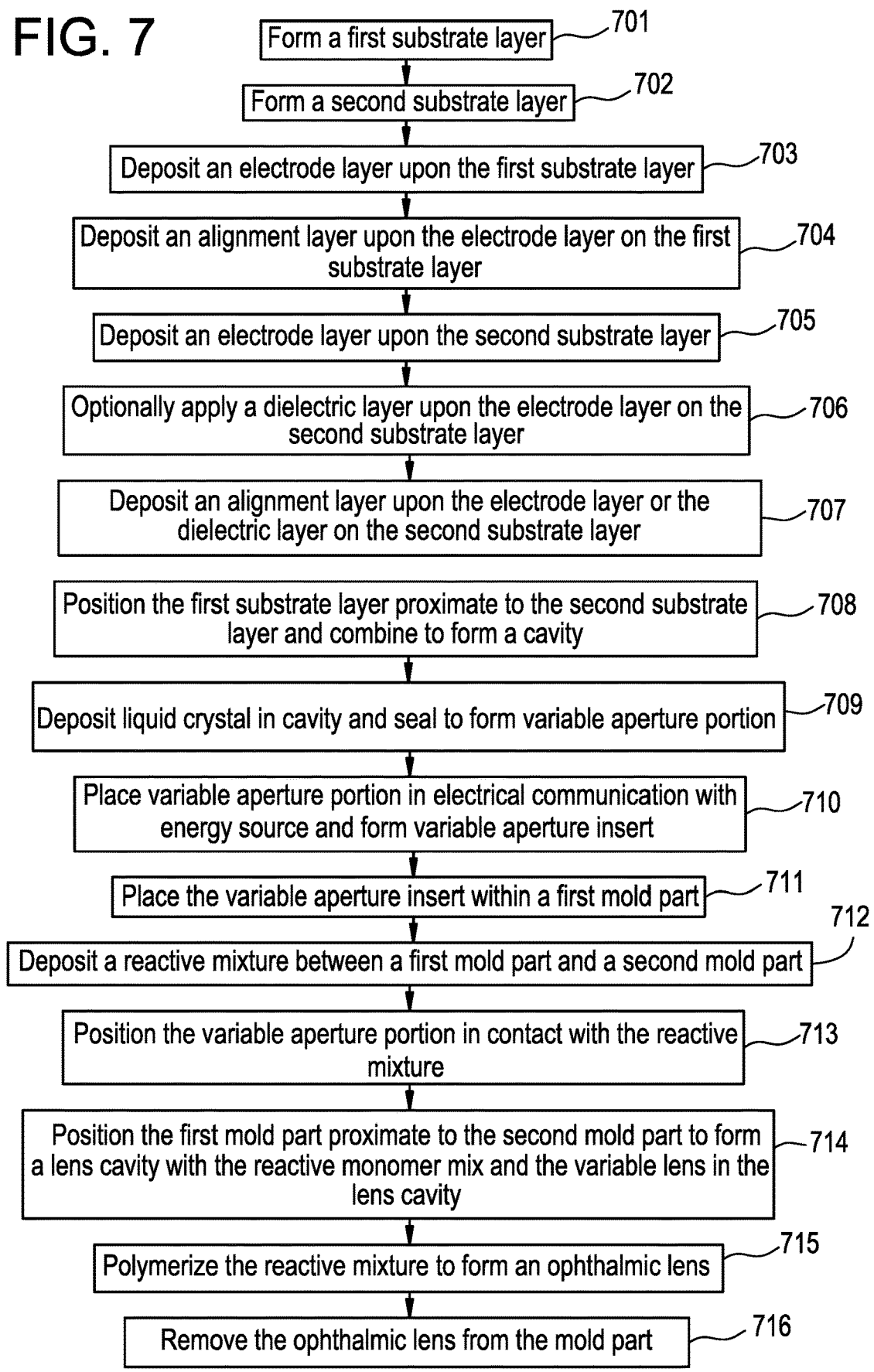
FIG. 7 illustrates method steps for forming an ophthalmic lens with a variable aperture insert.

Referring to FIG. 7, a flowchart illustrates exemplary steps that may be used to implement the present invention. At 701, forming a first substrate layer which may comprise a back curve surface and have a top surface with a shape of a first type that may differ from the shape of surface of other substrate layers. In some examples, the difference may include a different radius of curvature of the surface at least in a portion that may reside in the optical zone. At 702, forming a second substrate layer which may comprise a front curve surface or an intermediate surface or a portion of an intermediate surface for more complicated devices. At 703, an electrode layer may be deposited upon the first substrate layer. The deposition may occur, for example, by vapor deposition or electroplating. In some examples, the first substrate layer may be part of an insert that has regions both in the optical zone and regions in the non-optic zone. The electrode deposition process may simultaneously define interconnect features in some embodiments. In some examples a dielectric layer may be formed upon the interconnects or electrodes. The dielectric layer may comprise numerous insulating and dielectric layers such as for example silicon dioxide.

At 704, the first substrate layer may be further processed to add an alignment layer upon the previously deposited dielectric or electrode layer. The alignment layers may be deposited upon the top layer on the substrate and then processed in standard manners, for example, rubbing techniques, to create the grooving features that are characteristic of standard alignment layers or by treatment with exposure to energetic particles or light. Thin layers of photoanisotropic materials may be processed with light exposure to form alignment layers with various characteristics. As mentioned previously, in methods to form layers of liquid crystal wherein polymer networked regions of interstitially located liquid crystal are formed, the methods may not include steps related to the formation of alignment layers.

At 705, the second substrate layer may be further processed. An electrode layer may be deposited upon the second substrate layer in an analogous fashion to step 703. Then in some examples, at 706, a dielectric layer may be applied upon the second substrate layer upon the electrode layer. The dielectric layer may be formed to have a variable thickness across its surface. As an example, the dielectric layer may be molded upon the first substrate layer. Alternatively, a previously formed dielectric layer may be adhered upon the electrode surface of the second substrate piece.

At 707, an alignment layer may be formed upon the second substrate layer in similar fashion to the processing step at 704. After 707, two separate substrate layers that may form at least a portion of an ophthalmic lens insert may be ready to be joined. In some examples at 708, the two pieces will be brought in close proximity to each other and then liquid crystal material may be filled in between the pieces. There may be numerous manners to fill the liquid crystal in between the pieces including as non-limiting examples, vacuum based filling where the cavity is evacuated and liquid crystal material is subsequently allowed to flow into the evacuated space. In addition, the capillary forces that are present in the space between the lens insert pieces may aid in the filling of the space with liquid crystal material. At 709, the two pieces may be brought adjacent to each other and then sealed to form a variable aperture element with liquid crystal. There may be numerous manners of sealing the pieces together including the use of adhesives, sealants, and physical sealing components such as o-rings and snap lock features as non-limiting examples.

In some examples, two pieces of the type formed at 709 may be created by repeating method steps 701 to 709 wherein the alignment layers are offset from each other to allow for a lens that may adjust the focal power of non-polarized light. In such examples, the two variable aperture layers may be combined to form a single variable aperture insert. At 710, the variable aperture portion may be connected to the energy source and intermediate or attached components may be placed thereon.

At 711, the variable aperture insert resulting at step 710 may be placed within a mold part. The variable aperture insert may or may not also comprise one or more components. In some preferred examples, the variable aperture insert is placed in the mold part via mechanical placement. Mechanical placement may include, for example, a robot or other automation, such as that known in the industry to place surface-mount components. Human placement of a variable aperture insert is also within the scope of the present invention. Accordingly, any mechanical placement or automation may be utilized which is effective to place a variable aperture insert with an energy source within a cast mold part such that the polymerization of a reactive mixture contained by the mold part will include the variable aperture in a resultant ophthalmic lens.

In some examples, a variable aperture insert may be placed in a mold part attached to a substrate. An energy source and one or more components may also be attached to the substrate and may be in electrical communication with the variable aperture insert. Components may include for example, circuitry to control power applied to the variable aperture insert. Accordingly, in some examples a component includes control mechanism for actuating the variable aperture insert to change one or more optical characteristics, such as, for example, a change of state between a first optical power and a second optical power.

In some examples, a processor device, microelectromechanical system (MEMS), nanoelectromechanical system (NEMS) or other component may also be placed into the variable aperture insert and in electrical contact with the energy source. At 712, a reactive monomer mixture may be deposited into a mold part. At 713, the variable aperture insert may be positioned into contact with the reactive mixture. In some examples the order of placement of variable aperture and depositing of monomer mixture may be reversed. At 714, the first mold part is placed proximate to a second mold part to form a lens-forming cavity with at least some of the reactive monomer mixture and the variable aperture insert in the cavity. As discussed above, preferred examples include an energy source and one or more components also within the cavity and in electrical communication with the variable aperture insert.

At 715, the reactive monomer mixture within the cavity is polymerized. Polymerization may be accomplished, for example, via exposure to one or both of actinic radiation and heat. At 716, the ophthalmic lens is removed from the mold parts with the variable aperture insert adhered to or encapsulated within the insert-encapsulating polymerized material making up the ophthalmic lens.

Although the invention herein may be used to provide hard or soft contact lenses made of any known lens material, or material suitable for manufacturing such lenses, preferably, the lenses of the invention are soft contact lenses having water contents of about 0 to about 90 percent. More preferably, the lenses are made of monomers containing hydroxy groups, carboxyl groups, or both or be made from silicone-containing polymers, such as siloxanes, hydrogels, silicone hydrogels, and combinations thereof. Material useful for forming the lenses of the invention may be made by reacting blends of macromers, monomers, and combinations thereof along with additives such as polymerization initiators. Suitable materials include, without limitation, silicone hydrogels made from silicone macromers and hydrophilic monomers.

Furthermore, while examples have been made for certain ophthalmic based lenses, it should be understand that various types of lens including lenses for spectacles, lenses for cameras, lenses for medical devices, and lenses for optical applications may be formed in analogous fashion or with similar design aspects as have been described herein.

Apparatus

Figure 8:
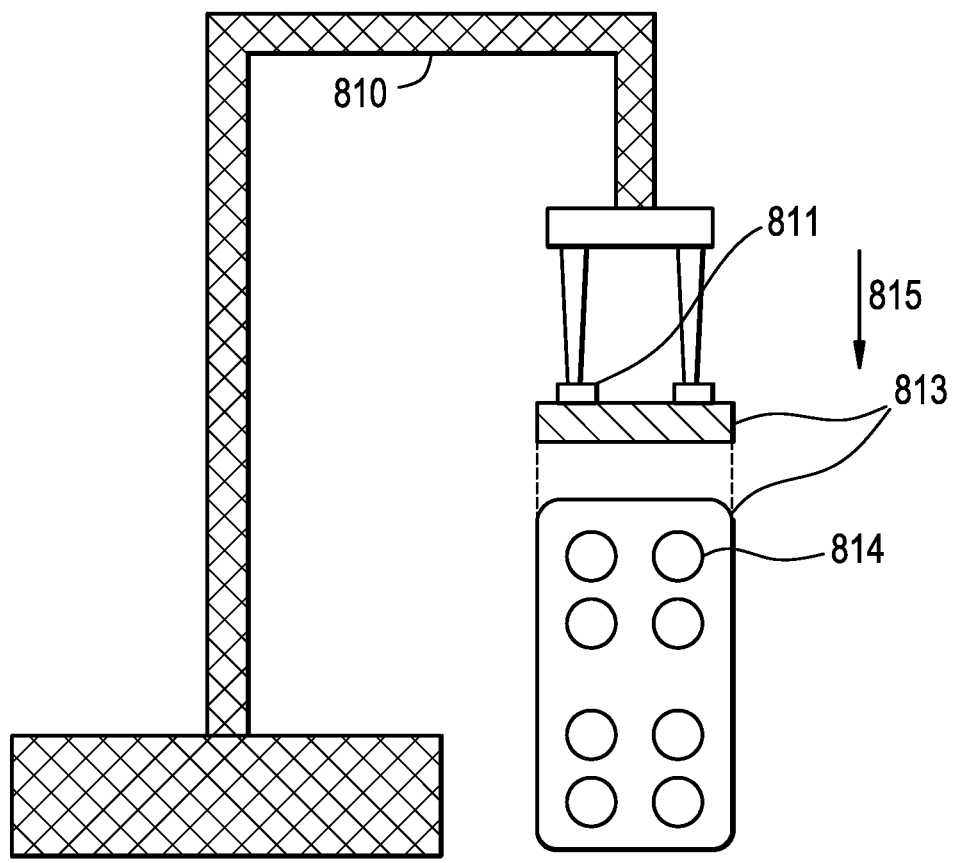
FIG. 8 illustrates an example of apparatus components for placing a variable aperture insert between shaped insert pieces into an ophthalmic lens mold part.

Referring now to FIG. 8, automated apparatus 810 is illustrated with one or more transfer interfaces 811. Multiple mold parts, each with an associated variable aperture insert 814 are contained on a pallet 813 and presented to transfer interfaces 811. Examples, may include, for example a single interface individually placing variable aperture insert 814, or multiple interfaces (not shown) simultaneously placing variable aperture inserts 814 into the multiple mold parts, and in some examples, in each mold part. Placement may occur via vertical movement 815 of the transfer interfaces 811.

Another aspect of some examples of the present invention includes apparatus to support the variable aperture insert 814 while the body of the ophthalmic lens is molded around these components. In some examples the variable aperture insert 814 and an energy source may be affixed to holding points in a lens mold (not illustrated). The holding points may be affixed with polymerized material of the same type that will be formed into the lens body. Other examples include a layer of prepolymer within the mold part onto which the variable aperture inserts 814 and an energy source may be affixed.

Processors Included in Insert Devices

Figure 9:
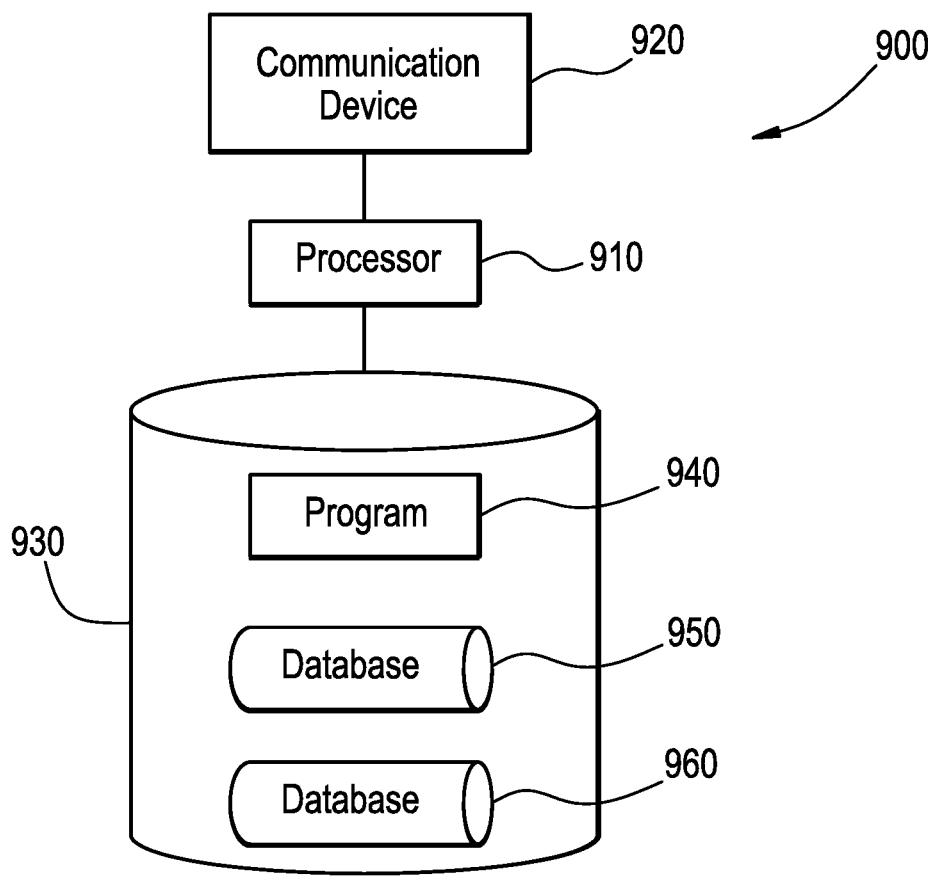
FIG. 9 illustrates a processor that may be used to implement some examples of the present invention.

Referring now to FIG. 9, a controller 900 is illustrated that may be used in some examples of the present invention. The controller 900 includes a processor 910, which may include one or more processor components coupled to a communication device 920. In some examples, a controller 900 may be used to transmit energy to the energy source placed in the ophthalmic lens.

The controller may include one or more processors, coupled to a communication device configured to communicate energy via a communication channel. The communication device may be used to electronically control one or more of the placement of a variable aperture insert into the ophthalmic lens or the transfer of a command to operate a variable aperture device.

The communication device 920 may also be used to communicate, for example, with one or more controller apparatus or manufacturing equipment components.

The processor 910 is also in communication with a storage device 930. The storage device 930 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 930 may store a program 940 for controlling the processor 910. The processor 910 performs instructions of the program 940, and thereby operates in accordance with the present invention. For example, the processor 910 may receive information descriptive of variable aperture insert placement, processing device placement, and the like. The storage device 930 may also store ophthalmic related data in one or more databases 950, 960. The database 950 and 960 may include specific control logic for controlling energy to and from a variable aperture lens.

In this description, reference has been made to elements illustrated in the figures. Many of the elements are depicted for reference to depict the examples of the inventive art for understanding. The relative scale of actual features may be significantly different from that as depicted, and variation from the depicted relative scales should be assumed within the spirit of the art herein. For example, liquid crystal molecules may be of a scale to be impossibly small to depict against the scale of insert pieces. The depiction of features that represent liquid crystal molecules at a similar scale to insert pieces to allow for representation of factors such as the alignment of the molecules is therefore such an example of a depicted scale that in actual examples may assume much different relative scale.

Although shown and described in what is believed to be the most practical and preferred examples, it is apparent that departures from specific designs and methods described and shown will suggest themselves to those skilled in the art and may be used without departing from the spirit and scope of the invention. The present invention is not restricted to the particular constructions described and illustrated, but should be constructed to cohere with all modifications that may fall within the scope of the appended claims.

What is claimed is:

1. A lens device comprising:
    an electroactive light blocking element, wherein the electroactive light blocking element is configured to allow for the adjustment of the transmittance with the application of an electrical signal;
    a lens body comprising the electroactive light blocking element;
    an energization element;
    a sensor configured to sense a location of the lens device on a surface of an eye; and
    a controller, wherein the controller controls the electroactive light blocking element to: form at least one aperture positioned in an optic zone of the lens device; calculate a centration of the lens on the eye; and move the at least one aperture in space to maintain a static centered location; and
    a plurality of light sources located at multiple locations of the lens device at the border between the iris and the sclera of the eye, wherein the sensor is capable of sensing different levels of light emitted by the light sources and reflected by the eye.

2. The lens device of claim 1 further comprising a plurality of transparent electrodes aligned across the top and bottom of the electroactive light blocking element.

3. The lens device of claim 1 wherein the plurality of transparent electrodes are formed of at least two interdigitated metal fingers.

4. The lens device of claim 1 further comprising an overmold that encapsulates the electroactive light blocking element, the energization element, and the controller.

5. The lens device of claim 1 wherein the at least one aperture comprises a plurality of apertures.

6. The lens device of claim 5 wherein the plurality of apertures are formed of at least two different shapes or sizes.

7. The lens device of claim 1 wherein the at least one aperture has a non-round shape.

8. The lens device of claim 1, wherein the sensor comprises a cadmium sulfide (CdS) thin film having a resistance responsive to photo flux and wherein the controller measures resistivity at a plurality of locations at the periphery of the lens body.

\* \* \* \* \*